United States Patent
Shih et al.

(10) Patent No.: US 8,379,059 B2
(45) Date of Patent: Feb. 19, 2013

(54) PORTABLE ELECTRONIC DEVICE AND METHOD FOR ADJUSTING DISPLAY ORIENTATION OF THE PORTABLE ELECTRONIC DEVICE

(75) Inventors: Yung-Ho Shih, Bellevue, WA (US); Yu-Keui Huang, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 638 days.

(21) Appl. No.: 12/634,829

(22) Filed: Dec. 10, 2009

(65) Prior Publication Data

US 2011/0032220 A1   Feb. 10, 2011

(30) Foreign Application Priority Data

Aug. 7, 2009   (CN) .......................... 2009 1 0305394

(51) Int. Cl.
*G09G 5/00* (2006.01)
(52) U.S. Cl. ......... 345/649; 345/158; 345/651; 345/659
(58) Field of Classification Search .................. None
See application file for complete search history.

(56) References Cited

U.S. PATENT DOCUMENTS

| 2008/0266326 | A1* | 10/2008 | Porwal | 345/659 |
|---|---|---|---|---|
| 2009/0179914 | A1* | 7/2009 | Dahlke | 345/619 |
| 2009/0295832 | A1* | 12/2009 | Takatsuka et al. | 345/659 |
| 2010/0066763 | A1* | 3/2010 | MacDougall et al. | 345/656 |
| 2010/0156907 | A1* | 6/2010 | VanderSpek et al. | 345/427 |
| 2010/0283860 | A1* | 11/2010 | Nader | 348/222.1 |

FOREIGN PATENT DOCUMENTS

WO   WO 2009068647 A1 *   6/2009

* cited by examiner

*Primary Examiner* — Adam R Giesy
(74) *Attorney, Agent, or Firm* — Altis Law Group, Inc.

(57) ABSTRACT

A portable electronic device may adjust a display orientation of a display screen of the portable electronic device according to data from a gravity sensor, a video camera, and a display orientation adjusting unit. The display orientation adjusting unit may analyze acceleration data of the portable electronic device to generate a first adjustment parameter, and analyze the facial image to generate a second adjustment parameter. Furthermore, the display orientation adjusting unit may determine whether the display orientation of the display screen needs to be adjusted, and adjust the display orientation of the display screen to a viewing orientation of the user according to the first adjustment parameter or the second adjustment parameter.

14 Claims, 4 Drawing Sheets

PORTABLE ELECTRONIC DEVICE AND METHOD FOR ADJUSTING DISPLAY ORIENTATION OF THE PORTABLE ELECTRONIC DEVICE

BACKGROUND

1. Technical Field

Embodiments of the present disclosure relate generally to display devices and displaying methods, and more particularly to a portable electronic device and method for adjusting a display orientation of a display screen of the portable electronic device.

2. Description of Related Art

A user may view a display screen of a portable electronic such as a notebook computer, personal digital assistant (PDA), or a mobile phone from different locations or positions. For example if the user lays on his side, then to be more comfortable and have a better viewing experience, the user must manually adjust orientation of the display screen, so that the user can view the displayed media right side up from his viewpoint, e.g. turn the portable electronic device over on it's side. However, such manual adjustment may be inconvenient for the user.

Accordingly, there is a need for a method for automatic adjustment of a display orientation of the portable electronic device, to provide more comfortable and better viewing experience to users.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
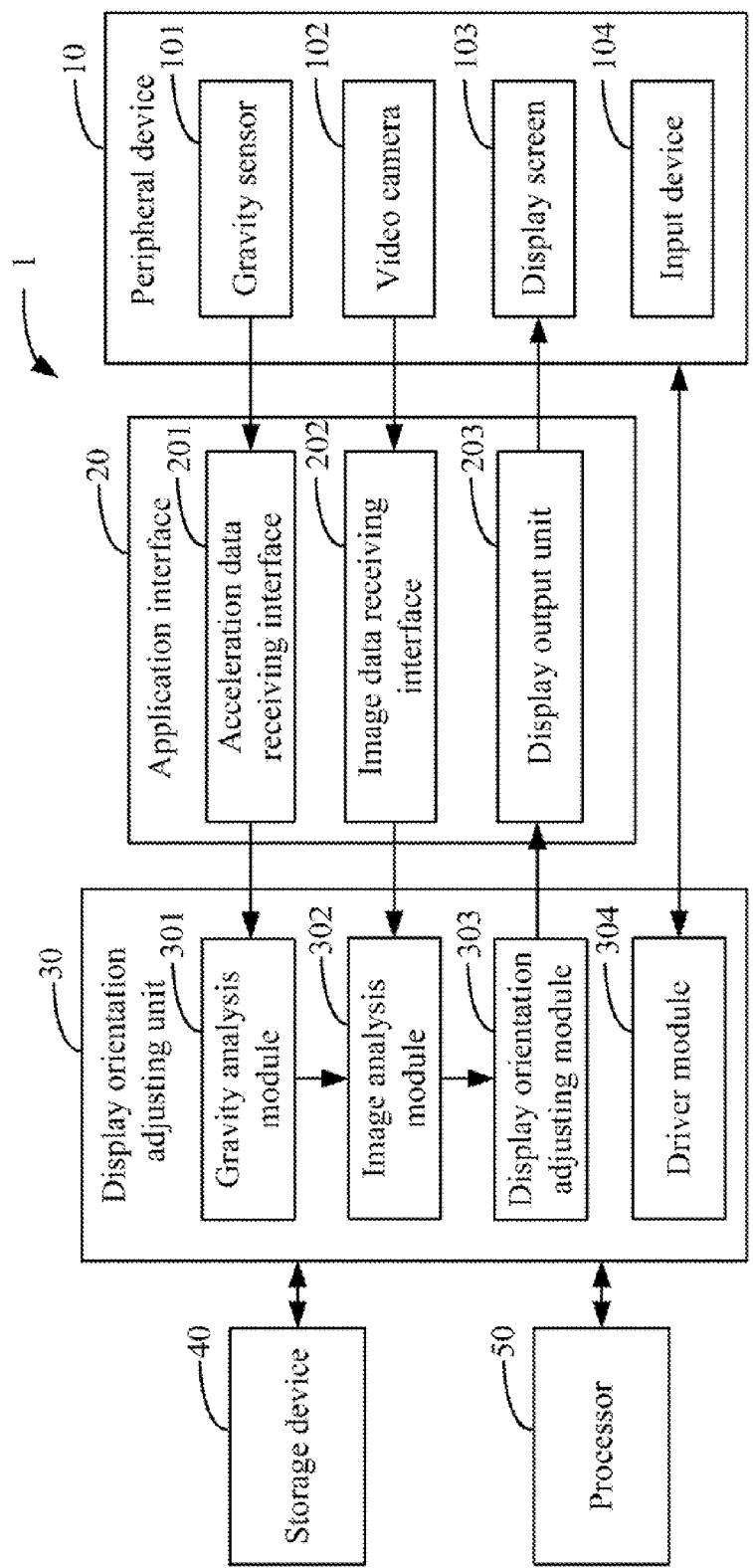
FIG. 1 is a schematic diagram of one embodiment of a portable electronic device.

FIG. 1 is a schematic diagram of one embodiment of a portable electronic device 1, which can adjust orientation of displayed content of the portable electronic device 1. In other words, the displayed content can be rotated to a degree corresponding to viewing disposition of a user to maximize viewing experience of the user. In one embodiment, the portable electronic device 1 includes a plurality of peripheral devices 10, a plurality of application interfaces 20, a display orientation adjusting unit 30, a storage device 40, and at least one processor 50. The peripheral devices may include a gravity sensor 101, a video camera 102, a display screen 103, and an input device 104. The application interfaces 20 may include an acceleration data receiving interface 201, an image data receiving interface 202, and a display unit 203. The display orientation adjusting unit 30 may include a gravity analysis module 301, an image analysis module 302, a display orientation adjusting module 303, and a driver module 304. The above mentioned components may be coupled by one or more communication buses or signal lines. It should be apparent that FIG. 1 is only one example of an architecture for the portable electronic device 1 that can be included with more or fewer components than shown, or a different configuration of the various components. The portable electronic device 1 can be a handheld computer, a tablet computer, a mobile phone, a media player, and a personal digital assistant (PDA), for example.

In one embodiment, one or more computerized codes of the display orientation adjusting unit 30 may be stored in the storage device 40 or a computer readable medium of the portable electronic device 1. In another embodiment, one or more computerized codes of the display orientation adjusting unit 30 may be included in an operating system of the portable electronic device 1, such as the Unix, Linux, Windows 95, 98, NT, 2000, XP, Vista, Mac OS X, an embedded operating system, or any other compatible operating system. The storage device 40 may be an internal storage device, such as a random access memory (RAM) for temporary storage of information and/or a read only memory (ROM) for permanent storage of information. The storage device 40 may also be an external storage device, such as a hard disk, a storage card, or a data storage medium. In the embodiment, each of the function modules 301-304 may comprise one or more computerized instructions or codes executable by the at least one processor 50 of the portable electronic device 1. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The gravity sensor 101 is operable to monitor movement of the portable electronic device 1 according to change in direction of acceleration relative to the portable electronic device 1, and sense acceleration data of the portable electronic device 1. In one embodiment, the acceleration data may include an acceleration direction and a gravity acceleration value during the gravity movement of the portable electronic device 1. The gravity sensor 101 is further operable to send the acceleration data to the gravity analysis module 301 via the acceleration data receiving interface 201. In one example, the gravity sensor 101 may be an accelerometer.

The video camera 102 is operable to capture a facial image of a user when the user uses the portable electronic device 1, and send the facial image to the image analysis module 302 via the image data receiving interface 202. The display screen 103 is operable to display different screen images when the user uses the portable electronic device 1 to access or store data. The input device 104 is operable to receive an input command for operating the portable electronic device 1 to perform a required operation. For example, when the video camera 102 is off, the user can input an image capturing command from the input device 104 to turn on the video camera 102. The input device 104 may be a keyboard, a keypad, or a touch screen, for example.

The gravity analysis module 301 is operable to receive the acceleration data of the portable electronic device 1 from the gravity sensor 101, analyze the acceleration data to obtain the acceleration direction of the portable electronic device 1 from the acceleration data. The gravity analysis module 301 is further operable to compare the acceleration direction with the display orientation of the display screen 103, and determine whether the display orientation of the display screen 103 needs to be adjusted according to the comparison. In addition, the gravity analysis module 301 is operable to generate a first adjustment parameter when the display orientation of the display screen 103 needs to be adjusted, and send the first adjustment parameter to the display orientation adjusting module 303. In one embodiment, the first adjustment parameter may include a rotational direction and a rotational degree of the display screen 103, such as 90 degrees clockwise from the user's viewpoint when the user has laid down on his/her right side.

The image analysis module 302 is operable to receive the facial image of the user from the video camera 102, and analyze the facial image to obtain a viewing orientation of the user relative to the display screen 103. For example, the image analysis module 302 may analyze the facial image when the user views the display screen 103 from an upright position, or a lying down position, for example. The image analysis module 302 is further operable to determine whether the display orientation of the display screen 103 needs to be adjusted according to the viewing orientation. In addition, the image analysis module 302 is operable to generate a second adjustment parameter when the display orientation of the display screen 103 needs to be adjusted, and send the second adjustment parameter to the display orientation adjusting module 303. In one embodiment, the second adjustment parameter may also include a rotational direction and a rotational degree of the display screen 103, such as 90 degrees clockwise from the user's viewpoint when the user have laid down on his/her right side.

The display orientation adjusting module 303 is operable to adjust the display orientation of the display screen 103 to the viewing orientation of the user according to the first adjustment parameter or the second adjustment parameter. The viewing orientation may be changed when the user changes a viewing position of the display screen 103, or the portable electronic device 1 moves in different directions. The change of the viewing position may mean the user is in front of the display but has sat lower (e.g., adjusted his/her seat, slouched, for example) or stood up.

The driver module 304 is operable to activate the peripheral devices 10 of the portable electronic device 1. For example, the driver module 304 may activate the gravity sensor 101 to sense the acceleration data of the portable electronic device 1 when the portable electronic device 1 is moved in different directions. The driver module 304 further activates the video camera 102 to capture the facial image of the user when the user uses the portable electronic device 1, or activates the input device 104 to receive an image capturing command to control the video camera 102 to capture the facial image.

Figure 2:
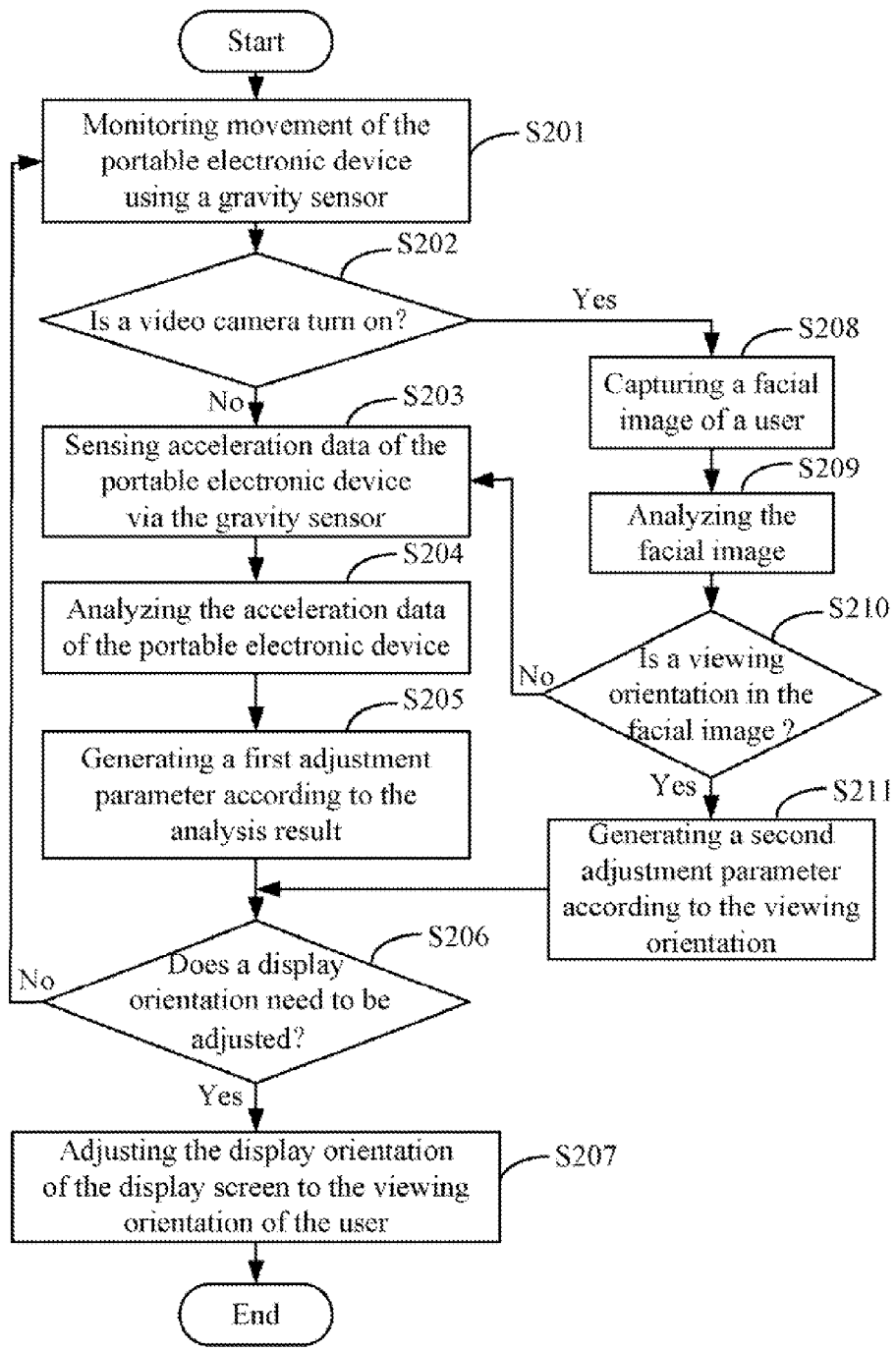
FIG. 2 is a flowchart of one embodiment of a method for adjusting a display orientation of the portable electronic device 1 as described in FIG. 1.

FIG. 2 is a flowchart of one embodiment of a method for automatically adjusting a display orientation of the display screen 103 of the portable electronic device 1 as described in FIG. 1. Depending on the embodiment, additional blocks may be added, others removed, and the ordering of the blocks may be changed.

In block S201, the gravity sensor 101 monitors movement of the portable electronic device 1 according to change in direction of acceleration relative to the portable electronic device 1. In block S202, the driver module 304 determines whether the video camera 102 is off. If the video camera 102 is off, block S203, the gravity sensor 101 senses acceleration data of the portable electronic device 1, and sends the acceleration data to the gravity analysis module 301 via the acceleration data receiving interface 201. In one embodiment, the acceleration data may include an acceleration direction and a gravity acceleration value during the gravity movement of the portable electronic device 1.

In block S204, the gravity analysis module 301 receives the acceleration data of the portable electronic device 1 from the gravity sensor 101, and analyzes the acceleration data to obtain a acceleration direction of the portable electronic device 1 from the acceleration data. In block S205, the gravity analysis module 301 compares the acceleration direction with the display orientation of the display screen 103, and generates a first adjustment parameter according to the comparison result. In one embodiment, the first adjustment parameter may determine a rotational direction and a rotational degree of the display screen 103, such as 90 degrees clockwise from the user's viewpoint when the user have laid down on his/her right side.

In block S206, the gravity analysis module 301 determines whether the display orientation of the display screen 103 needs to be adjusted according to the comparison. If the display orientation of the display screen 103 does not need to be adjusted, the flow returns to block S201 as described above. Otherwise, if the display orientation of the display screen 103 needs to be adjusted, the flow goes to block S207 as described below.

In block S202 as mentioned above, if the video camera 102 is turn on, in block S208, the video camera 102 captures a facial image of a user when the user views the display screen 103 of the portable electronic device 1, and sends the facial image to the image analysis module 302 via the image data receiving interface 202. In block S209, the image analysis module 302 analyzes the facial image to generate an image analysis result. The detail descriptions of analysis the facial image are described in FIG. 3 and FIG. 4 as described below. In block S210, the image analysis module 302 determines whether a viewing orientation is detected in the facial image according to the image analysis result. If no viewing orientation is detected in the facial image, the flow goes to block S203 as described above. Otherwise, if any viewing orientation is detected in the facial image, in block S211, the image analysis module 302 generates a second adjustment parameter according to the viewing orientation, and the flow goes to block S206 as described above. In one embodiment, the second adjustment parameter may determine a rotational direction and a rotational degree of the display screen 103.

As above-mentioned bock S207, the display orientation adjusting module 303 adjusts the display orientation of the display screen 103 to a viewing orientation of the user according to the first adjustment parameter or the second adjustment parameter. In one embodiment, the viewing orientation may be changed when the user changes a viewing position of the display screen 103, or the portable electronic device 1 moves in different directions. The change of the viewing position may mean the user is in front of the display but has sat lower (e.g., adjusted his/her seat, slouched, for example) or stood up.

Figure 3:
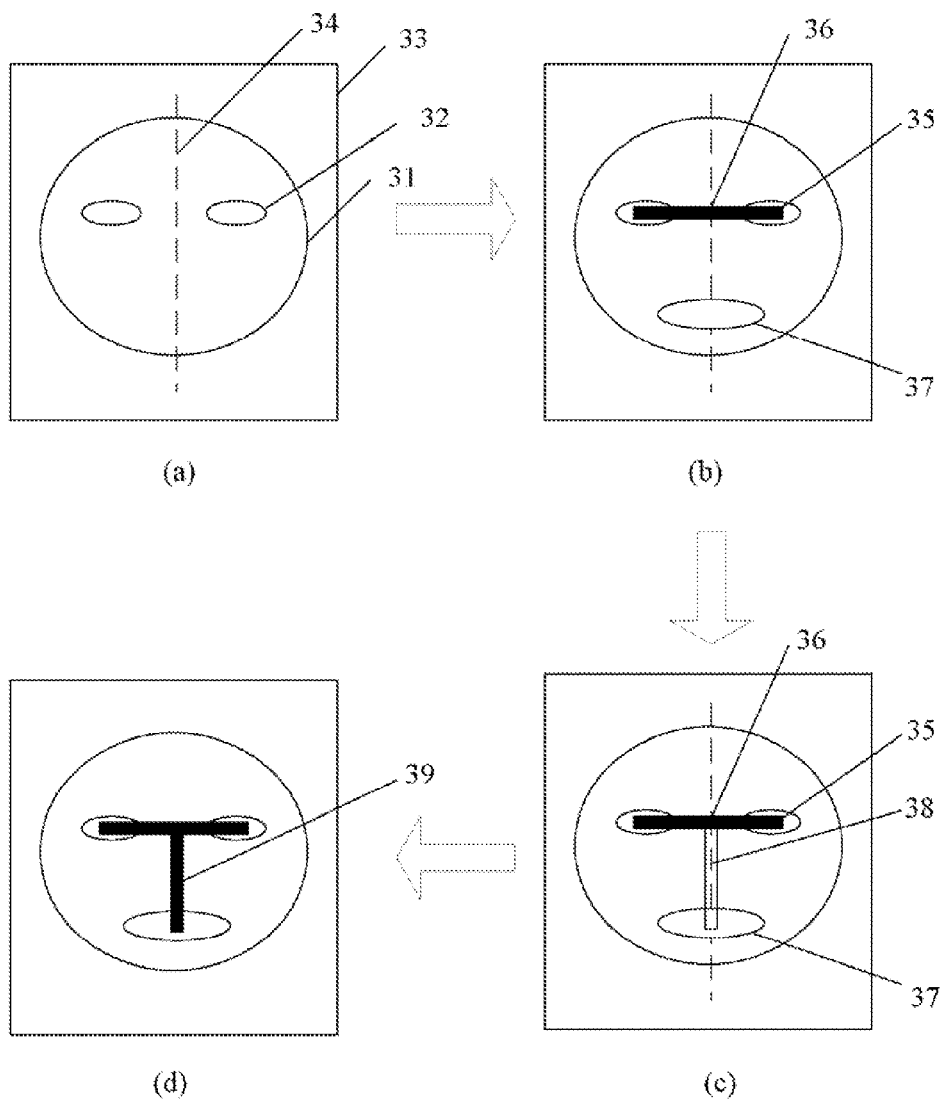
FIG. 3 shows schematic diagrams illustrating one example of analyzing a facial image to obtain adjustment parameters of a display screen.

FIG. 3 shows schematic diagrams illustrating one example of analyzing the facial image to generate the second adjustment parameter of the display screen 103. Depending on the example, the user may stand up in front of the display screen 103 when the user uses the portable electronic device 1. In one embodiment, the image analysis module 302 analyzes facial features that may include segments of topmost point of the forehead such as at the hairline directly above the nose, eyes, nose, and mouth. It may be understood that various image processing methods, such as an image segmentation method may be used to obtain such segments from the facial image. In FIG. 3, the facial features may be denoted as circles 31, 32, and 37 in the facial image 33. The circles 31, 32, and 37 respectively denote the face, the eyes, and the mouth of the user. The image analysis module 302 obtains a vertical center line 34 and a horizontal line 35 between the eyes 32 of the user in the facial image 33. The image analysis module 302 further obtains an intersection 36 point between the vertical center line 34 and a horizontal line 35. In addition, the image analysis module 302 draws a shape "T" 39 from the intersection 36 to the mouth 37 along the vertical center line 34. The image analysis module 302 generates the adjustment parameter of the display screen 103 based on the shape "T" 39.

Figure 4:
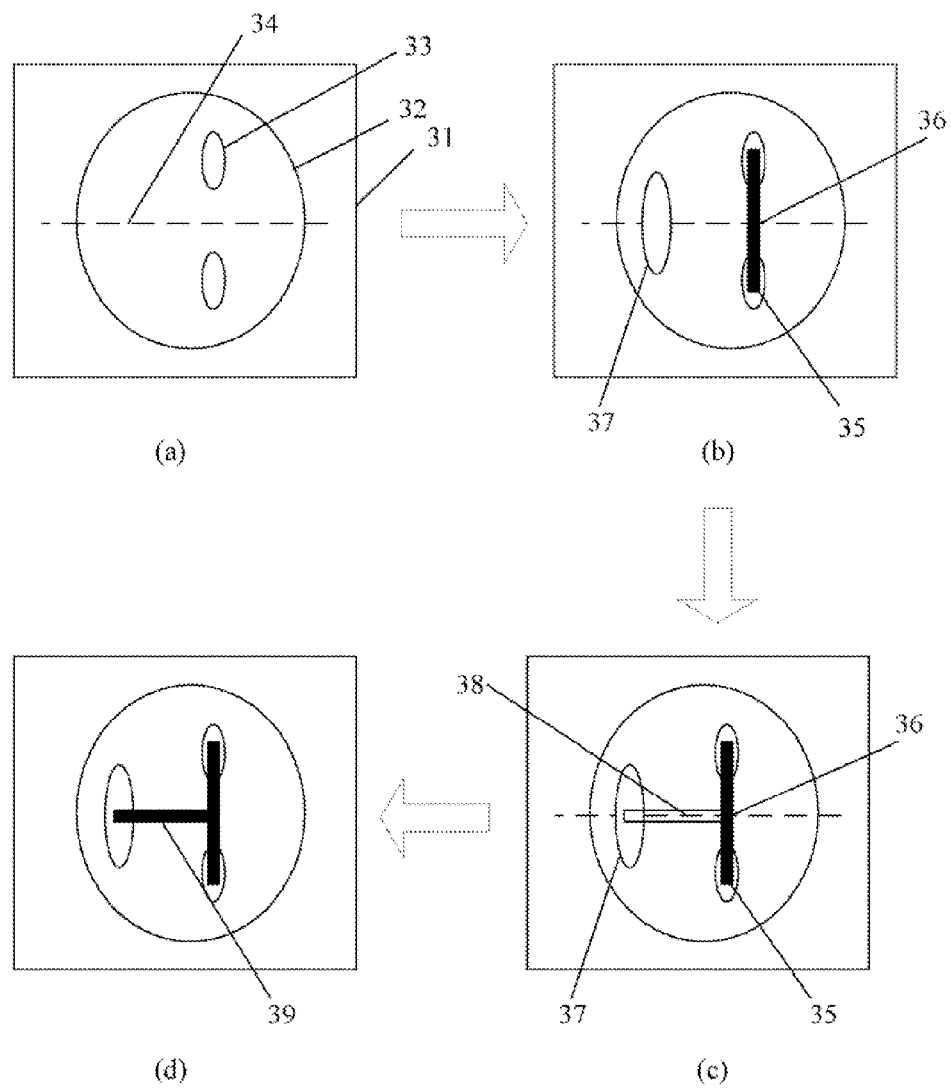
FIG. 4 shows schematic diagrams illustrating another example of analyzing a facial image to generate the adjustment parameters of the display screen.

FIG. 4 shows schematic diagrams illustrating another example of analyzing the facial image to obtain the second adjustment parameter of the display screen 103. Depending on the example, the user may drop down his/her seat (e.g., adjust his/her seat, slouch, for example) in front of the display screen 103 when the user uses the portable electronic device 1. According to the image segmentation method as described in FIG. 3, the image analysis module 302 may also generate the second adjustment parameter of the display screen 103 of the portable electronic device 1.

All of the processes described above may be embodied in, and fully automated via, functional code modules executed by one or more general purpose processors of portable electronic devices. The functional code modules may be stored in any type of readable medium or other storage devices. Some or all of the methods may alternatively be embodied in specialized computer hardware.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device comprising a display screen, the portable electronic device comprising:
   a gravity sensor operable to monitor movement of the portable electronic device according to change in direction of acceleration relative to the portable electronic device, and sense acceleration data of the portable electronic device;
   a video camera operable to capture a facial image of a user when the user views the display screen;
   a gravity analysis module operable to analyze the acceleration data to obtain an acceleration direction of the portable electronic device from the acceleration data, compare the acceleration direction of the portable electronic device with the display orientation of the display screen, determine whether the display orientation needs to be adjusted according to the comparison, and generate a first adjustment parameter for adjusting the display screen when the display orientation needs to be adjusted;
   an image analysis module operable to analyze the facial image to obtain a viewing orientation from the facial image by using an image segmentation method comprising steps of: obtaining a vertical center line and a horizontal line between eyes of a user in the facial image, obtaining an intersection point between the vertical center line and the horizontal line, and drawing a shape "T" from the intersection to a mouth of the user along the vertical center line, determine whether the display orientation of the display screen needs to be adjusted according to the viewing orientation, and generate a second adjustment parameter for adjusting the display screen based on the shape "T" when the display orientation needs to be adjusted; and
   a display orientation adjusting module operable to adjust the display orientation of the display screen to the viewing orientation of the user according to the first adjustment parameter or the second adjustment parameter.

2. The portable electronic device according to claim 1, further comprising a driver module operable to activate the gravity sensor to sense the acceleration data of the portable electronic device, and activate the video camera to capture the facial image of the user when the user views the display screen.

3. The portable electronic device according to claim 1, further comprising an acceleration data receiving interface operable to transmit the acceleration data of the portable electronic device to the gravity analysis module.

4. The portable electronic device according to claim 1, further comprising an image data receiving interface operable to transmit the facial image to the image analysis module.

5. The portable electronic device according to claim 1, wherein each of the first adjustment parameter and the second adjustment parameter comprises a rotational direction and a rotational degree of the display screen.

6. The portable electronic device according to claim 1, wherein the portable electronic device is a handheld computer, a tablet computer, a mobile phone, a media player, or a personal digital assistant.

7. A method for adjusting a display orientation of a display screen of a portable electronic device, the method comprising:
   (a) monitoring movement of the portable electronic device using a gravity sensor according to change in direction of acceleration relative to the portable electronic device;
   (b) determining whether a video camera is turned on or turned off;
   (c) if the video camera is turned off, executing block (c1) to block (c5):
      (c1) sensing acceleration data of the portable electronic device via the gravity sensor;
      (c2) analyzing the acceleration data to obtain an acceleration direction of the portable electronic device from the acceleration data;
      (c3) comparing the acceleration direction of the portable electronic device with the display orientation of the display screen;
      (c4) determining whether the display orientation of the display screen needs to be adjusted according to the comparison result; and
      (c5) generating a first adjustment parameter for adjusting the display orientation of the display screen when the display orientation of the display screen needs to be adjusted;
   (d) if the video camera is turned on, executing block (d1) to block (d4):
      (d1) capturing a facial image of a user using the video camera when the user views the display screen;
      (d2) analyzing the facial image to obtain a viewing orientation from the facial image by using an image segmentation method comprising steps of: obtaining a vertical center line and a horizontal line between eyes of a user in the facial image, obtaining an intersection point between the vertical center line and the horizontal line, and drawing a shape "T" from the intersection to a mouth of the user along the vertical center line;
      (d3) determining whether the display orientation of the display screen needs to be adjusted according to the viewing orientation; and (d4) generating a second adjustment parameter for adjusting the display orientation of the display screen based on the shape "T" when the display orientation of the display screen needs to be adjusted; and (e) adjusting the display orientation of the display screen to the viewing orientation of the user according to the first adjustment parameter or the second adjustment parameter.

8. The method according to claim 7, further comprising:

activating the gravity sensor to sense the acceleration data of the portable electronic device; and activating the video camera to capture the facial image of the user when the user views the display screen.

9. The method according to claim 7, wherein each of the first adjustment parameter and the second adjustment parameter comprises a rotational direction and a rotational degree of the display screen.

10. The method according to claim 7, wherein the portable electronic device is a handheld computer, a tablet computer, a mobile phone, a media player, or a personal digital assistant.

11. A non-transitory storage medium having stored thereon instructions that, when executed by at least one processor of a portable electronic device, cause the portable electronic device to perform a method for adjusting a display orientation of a display screen, the method comprising:

(a) monitoring movement of the portable electronic device using a gravity sensor according to change in direction of acceleration relative to the portable electronic device;

(b) determining whether a video camera is turned on or turned off;

(c) if the video camera is turned off, executing block (c1) to block (c5):

(c1) sensing acceleration data of the portable electronic device via the gravity sensor;

(c2) analyzing the acceleration data to obtain an acceleration direction of the portable electronic device from the acceleration data;

(c3) comparing the acceleration direction of the portable electronic device with the display orientation of the display screen;

(c4) determining whether the display orientation of the display screen needs to be adjusted according to the comparison; and (c5) generating a first adjustment parameter for adjusting the display orientation of the display screen when the display orientation of the display screen needs to be adjusted;

(d) if the video camera is turned on, executing block (d1) to block (d4):

(d1) capturing a facial image of a user using the video camera when the user views the display screen;

(d2) analyzing the facial image to obtain a viewing orientation from the facial image by using an image segmentation method comprising steps of: obtaining a vertical center line and a horizontal line between eyes of a user in the facial image, obtaining an intersection point between the vertical center line and the horizontal line, and drawing a shape "T" from the intersection to a mouth of the user along the vertical center line;

(d3) determining whether the display orientation of the display screen needs to be adjusted according to the viewing orientation; and (d4) generating a second adjustment parameter for adjusting the display orientation of the display screen based on the shape "T" when the display orientation needs to be adjusted; and (e) adjusting the display orientation of the display screen to the viewing orientation of the user according to the first adjustment parameter or the second adjustment parameter.

12. The non-transitory storage medium according to claim 11, wherein the method further comprises:

activating the gravity sensor to sense the acceleration data of the portable electronic device; and activating the video camera to capture the facial image of the user when the user views the display screen.

13. The non-transitory storage medium according to claim 11, wherein each of the first adjustment parameter and the second adjustment parameter comprises a rotational direction and a rotational degree of the display screen.

14. The non-transitory storage medium according to claim 11, wherein the portable electronic device is a handheld computer, a tablet computer, a mobile phone, a media player, or a personal digital assistant.

* * * * *